(No Model.)
J. E. WARREN.
FILTER.
No. 379,349. Patented Mar. 13, 1888.
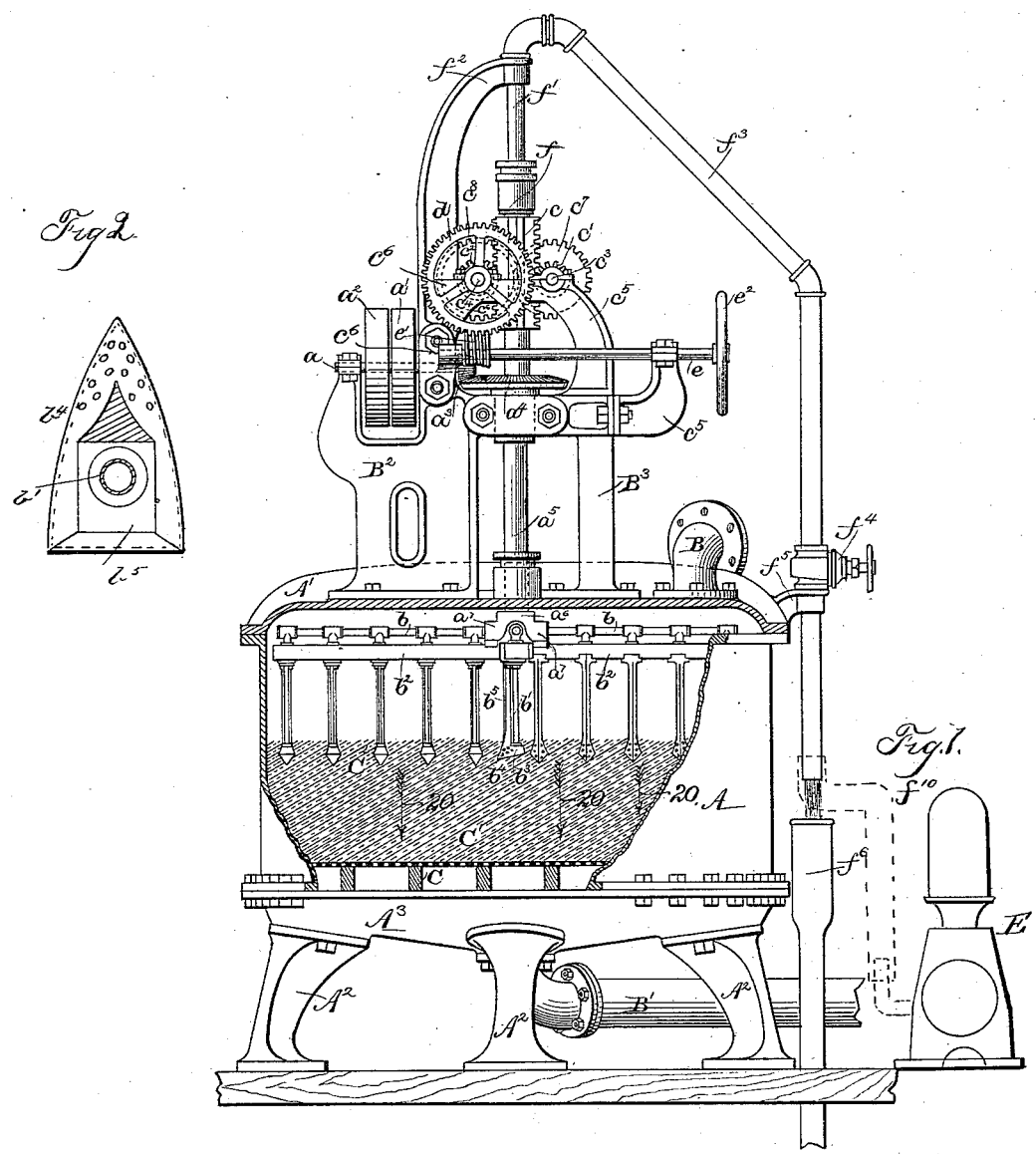
WITNESSES.
C. M. Cone.
Fred L. Emery.
INVENTOR
John E. Warren,
BY Crosby & Gregory,
ATTY'S

UNITED STATES PATENT OFFICE.

JOHN E. WARREN, OF CUMBERLAND MILLS, MAINE, ASSIGNOR OF ONE-HALF TO S. D. WARREN & COMPANY, OF BOSTON, MASSACHUSETTS.

FILTER.

SPECIFICATION forming part of Letters Patent No. 379,349, dated March 13, 1888.

Application filed March 22, 1887. Serial No. 231,891. (No model.)

*To all whom it may concern:*

Be it known that I, JOHN E. WARREN, of Cumberland Mills, county of Cumberland, and State of Maine, have invented an Improvement in Method of Filtration, of which the following description, in connection with the accompanying drawings, is a specification, like letters on the drawings representing like parts.

This invention relates to the art of filtration, especially adapted for treating impure water, it having for its object to provide a novel method of filtering, whereby slime or other sedimentary matter accumulated on the surface of or in the filter-bed may be removed therefrom without stopping or in the least retarding the filtration, thus enabling the filter to be used continuously.

My invention therefore consists, essentially, in passing the liquid substance through a filtering-bed in one direction and simultaneously taking from at or near the surface of the filtering-bed, but in a direction opposite the travel of the main body of liquid to be filtered, the slimy or sedimentary matter constantly accumulating at the surface of the said bed and discharging the said slimy or sedimentary matter separate from the filtered liquid, substantially as will be described.

Figure 1 shows in elevation and section a filtering apparatus constructed in accordance with this invention, the cistern or tank being broken out to show the interior construction of the apparatus. Fig. 2 is a sectional detail to be referred to, the section being taken on $x\ x$, Fig. 1.

The cistern or tank A may be of any convenient or desired capacity, it being herein shown as closed by the cover A' and having its bottom $A^3$ supported upon legs or standards $A^2$, the said cistern or tank being provided with the inlet-pipe B and outlet-pipe B'.

The cistern or tank has a false bottom composed, as herein shown, of slats C, separated from one another, the said slats supporting, as shown, a perforated metal plate, C', upon which rests the bed $C^2$ of filtering material, which may be any of the well-known substances employed for filtering purposes—such, for instance, as gravel, sand, charcoal, bone, &c.

The cistern A supports the standard or upright $B^2$, forming bearings for the shaft $a$, having mounted thereon the fast and loose pulleys $a'\ a^2$, respectively, and the said shaft is provided at its end with the pinion $a^3$, meshing with the gear $a^4$, secured to the shaft $a^5$. The shaft $a^5$ in the present instance is hollow, and at its lower end, within the cistern A, the said hollow shaft is provided with a fitting, $a^6$, having radial arms $a^7$, herein shown at right angles to each other. Each arm $a^7$ has fitted to it a pipe, $b$, and each pipe $b$ has, as shown, a series of independent branch pipes, $b'$, which are shown by dotted lines, Fig. 1, as extended through a beam, $b^2$, located below and substantially in line with the pipes $b$.

Each depending branch pipe $b'$, as herein shown, has co-operating with it a strengthening rib or bar, $b^5$, fastened, as shown, by bolts 40 to the beam $b^2$, the said rib or bar having an enlarged hollow foot portion, $b^3$, constituting a chamber, into which the lower end of the branch pipe $b'$ is fitted. The sides of the enlarged foot portion or chamber are provided with perforations $b^4$, for a purpose to be described, the said foot portion and pipe $b'$ connected therewith being best shown in Fig. 2.

The hollow shaft $a^5$ has secured to it by a spline-connection a sleeve, $c$, provided at opposite sides with racks which are engaged by pinions $c'\ c^2$ on shafts $c^3\ c^4$, respectively, supported in brackets $c^5\ c^6$, the said shafts also having the gears $c^7 c^8$ in mesh with each other. The shaft $c^4$ has mounted on it a worm-gear, $d$, in engagement with a worm, $e'$, on a spindle, $e$, having bearings in brackets $c^5\ c^6$, secured, respectively, to the uprights $B^3\ B^2$, the said shaft also having the hand-wheel $e^2$.

The hollow shaft $a^5$ is provided at its upper extremity with a stuffing box or gland, $f$, into which is fitted the end of a stationary pipe, $f'$, supported in an arm, $f^2$, of the bracket $c^6$, the said stationary pipe above the said arm being connected to a pipe, $f^3$, provided with a valve, $f^4$, the said pipe $f^3$ being shown as supported by a bracket, $f^5$, and adapted to discharge into a larger pipe, $f^6$.

In the operation of my improved filter the water or other fluid to be purified is discharged into the cistern A through the inlet-pipe B, the said fluid percolating through the filtering-bed and flowing from the said cistern through the outlet B'.

In the process of filtration the surface or upper layer of the filtering-bed receives and retains all or the greater part of the foreign or impure matter contained in the fluid to be filtered. This foreign or impure matter exists, principally, in the form of a slimy sediment resting upon or loosely held by the surface of the filtering-bed.

In accordance with my invention the slimy sedimentary matter referred to may be removed without necessitating the stopping of the filtering process by means of a suction engine or pump, E, connected, as shown in dotted lines, by pipe $f^{10}$ to the mouth of the pipe $f^3$, by which fluid is drawn up through the pipes $b'$ and $b^2$ and hollow shaft $a^5$, and thence through the pipes $f^2 f^{10}$ and pump E, it being discharged from the said pump into the pond, from whence it is taken, or to any other desirable receptacle; or it may be permitted to run to waste, the fluid and slimy matter passing from the cistern into the pipes $b'$ through the perforations $b^4$ in the walls of the foot or chamber $b^3$.

Instead of employing the pump E, the internal pressure of the water upon the filtering-bed in the covered tank A may be depended upon to force the fluid containing the sedimentary matter up the hollow shaft $a^5$, from which it is discharged into the pipe $f^6$, connected, it may be, with any suitable reservoir or receptacle.

It will be noticed that the process of removing the slimy matter is supposed to take place with the agitator at rest; but it is evident the said process may, and in practice will, mainly, take place while the said agitator is being revolved, and at the same time made to travel in a vertical path within a limited range.

When it is desired to rotate the hollow shaft $a^5$, a belt (not shown) is shipped from the loose pulley $a^2$ to the fast pulley $a'$, thereby rotating the shaft $a$ and pinion $a^3$, the latter rotating the gear $a^4$ and hollow shaft $a^5$.

The agitating device may be raised and lowered from above or near the surface to near the bottom C' by turning the hand-wheel $e^2$, causing the sleeve $c$ to be moved up or down through the gearing described.

While the slimy matter is being removed, as shown in the drawings, the process of filtering is going on, as indicated by the arrows 20.

The apparatus by which the above-described method for removing slime or sedimentary matter is accomplished is not herein claimed, as it forms the subject-matter of another application, Serial No. 257,296, filed by me December 8, 1887.

I claim—

That improvement in the art of filtration which consists in passing the liquid substance through a filtering-bed in one direction, and simultaneously taking from at or near the surface of the filtering bed, but in a direction opposite the travel of the main body of liquid to be filtered, the slimy or sedimentary matter constantly accumulating at the surface of the said bed and discharging the said slimy or sedimentary matter separate from the filtered liquid, substantially as described.

In testimony whereof I have signed my name to this specification in the presence of two subscribing witnesses.

JOHN E. WARREN.

Witnesses:
W. E. AYER,
A. A. CORDWELL.